(12) United States Patent
Buckley et al.

(10) Patent No.: US 11,886,509 B2
(45) Date of Patent: *Jan. 30, 2024

(54) PREDICTIVE PROMPT GENERATION BY AN AUTOMATED PROMPT SYSTEM

(71) Applicant: Optum Services (Ireland) Limited, Dublin (IE)

(72) Inventors: Gregory Buckley, County Dublin (IE); Jack Sullivan, Dublin (IE); Damian Kelly, Kilcock (IE); Mariah Sonja Pereira Penha, Dublin (IE); Bruno Ohana, Dublin (IE)

(73) Assignee: OPTUM SERVICES (IRELAND) LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,558

(22) Filed: Aug. 9, 2022

(65) Prior Publication Data
US 2023/0153356 A1 May 18, 2023

Related U.S. Application Data

(63) Continuation of application No. 16/911,766, filed on Jun. 25, 2020, now Pat. No. 11,455,340.

(51) Int. Cl.
*G06F 16/9032* (2019.01)
*H04M 3/51* (2006.01)
(Continued)

(52) U.S. Cl.
CPC ....... *G06F 16/90332* (2019.01); *G06N 3/049* (2013.01); *H04L 5/02* (2013.01); *H04M 3/5166* (2013.01)

(58) Field of Classification Search
None
See application file for complete search history.

(56) References Cited

U.S. PATENT DOCUMENTS 9,177,318 B2   11/2015   Shen et al.
9,648,164 B1   5/2017    Harris
(Continued)

FOREIGN PATENT DOCUMENTS

CN   106448670 A   2/2017

OTHER PUBLICATIONS

Next-Gen Technology. "How Artificial Intelligence In The Contact Center Reduces Call Volume," Telus International, Feb. 8, 2018, (7 pages). [Article, Online]. [Retrieved from the Internet Sep. 24, 2020] <URL: https://www.telusinternational.com/articles/artificial-intelligence-call-volume>.

(Continued)

*Primary Examiner* — Antim G Shah
(74) *Attorney, Agent, or Firm* — Alston & Bird LLP

(57) ABSTRACT

Systems and methods are configured for predictive prompt generation for an interaction between a party and an automated prompt system. In various embodiments, metadata is received on the interaction and provided as input to a multi-label predictive model to generate interaction probabilities for a plurality of prompt information data objects. Each probability generated by the predictive model provides a likelihood a particular information data object needs to be provided to the first party during the interaction. Accordingly, one or more of the prompt information data objects are identified based on the probability of each piece found in the one or more prompt information data objects that satisfy a set threshold and one or more notifications are provided so that the automated prompt system provides at least one of the prompt information data objects to the first party during the interaction.

20 Claims, 8 Drawing Sheets

(51) Int. Cl.
*G06N 3/049* (2023.01)
*H04L 5/02* (2006.01)

(56) References Cited

U.S. PATENT DOCUMENTS

| | | | |
|---|---|---|---|
| 11,455,340 B2* | 9/2022 | Buckley | G06N 3/049 |
| 2010/0191658 A1 | 7/2010 | Kannan et al. | |
| 2016/0275582 A1* | 9/2016 | Zuverink | G06F 3/04842 |
| 2017/0242886 A1* | 8/2017 | Jolley | G06F 40/232 |
| 2017/0249557 A1 | 8/2017 | Tendick | |
| 2018/0068031 A1 | 3/2018 | Hewavitharana et al. | |
| 2018/0165691 A1 | 6/2018 | Heater et al. | |
| 2018/0288230 A1 | 10/2018 | Baughman et al. | |
| 2019/0005024 A1 | 1/2019 | Somech et al. | |
| 2019/0095927 A1 | 3/2019 | Shimpi et al. | |
| 2019/0098136 A1 | 3/2019 | Odinak et al. | |
| 2019/0114321 A1 | 4/2019 | Am et al. | |
| 2019/0132451 A1* | 5/2019 | Kannan | H04M 3/5235 |
| 2019/0171726 A1 | 6/2019 | Ahmed et al. | |
| 2019/0287512 A1 | 9/2019 | Zoller et al. | |
| 2020/0007474 A1* | 1/2020 | Zhang | G09B 7/02 |
| 2020/0019876 A1 | 1/2020 | Appel et al. | |
| 2020/0043015 A1 | 2/2020 | Shaev et al. | |
| 2020/0065334 A1 | 2/2020 | Rodriguez et al. | |
| 2021/0097110 A1 | 4/2021 | Asthana et al. | |

OTHER PUBLICATIONS

Schelmetic, Tracey E. "Using AI and Machine Learing to Make IVR Smarter," Call Center Scheduling, Nov. 13, 2019, (7 pages). [Article, Online]. [Retrieved from the Internet Sep. 24, 2020] <URL: https://www.tmcnet.com/channels/call-center-scheduling/articles/443742-using-ai-machine learning-make-ivr-smarter.htm>.

* cited by examiner

PREDICTIVE PROMPT GENERATION BY AN AUTOMATED PROMPT SYSTEM

CROSS-REFERENCE TO RELATED APPLICATIONS

The present application is a continuation of U.S. Non-Provisional patent application Ser. No. 16/911,766, filed Jun. 25, 2020, which is incorporated by reference herein in its entirety.

TECHNOLOGICAL FIELD

Embodiments of the present invention generally relate to generating information data objects to provide to a party by an automated prompt system during an interaction.

BACKGROUND

Many automated systems are used today to interact with a party without the need for another party to be involved (e.g., without the need for human intervention). For example, many contact centers make use of interactive voice response (IVR) technology that interacts with callers and gathers a variety of information from these callers through the use of voice and dual-tone multi-frequency (DTMF) tones that may be input by the callers using keypads. In many instances, the gathered information may then be used to route the calls to the most suitable agents. For instance, the callers may be provided one or more prompts asking the callers for their member ID, address, date of birth, and/or the like, or to describe the intent for the calls. The IVR may then package up this information collected from the callers and send the information on to a routing logic system.

However, many of these prompts provided to the callers are manually designed and as a result, tend to be limited to information necessary for the routing logic system to route the calls. This is the case because setting up the prompts can many times be labor intensive. Therefore, as a result, IVRs are not typically used as aids to gather information that may be helpful to agents in handling the calls. Once a call is routed to an agent, he or she is often required to ask routine questions to the caller that may take up a significant proportion of the call and lead to a longer call. Typically, the longer the duration of the call, the higher the operational cost and the lower the efficiency in using contact center resources.

Oftentimes many of the routine questions asked by an agent upon fielding a call may be better suited to be asked under an automated setting. However, the vast complexity of a contact center system and the sheer volume of different reasons for a caller to call results in infeasibility with respect to manually identifying what routine questions should be automated and incorporating them into the IVR. The same can be said for other information that is not necessarily a question but may help to shorten the duration of time agents have to spend on calls and/or eliminate their need to field many calls at all. For example, determining a caller is simply calling to find the status of an order placed online and then providing the order information to the caller automatically can eliminate the caller's need to even talk to an agent at all.

Therefore, a need exists in the industry for improved systems and methods for identifying and integrating information that is configured to be provided via an automated prompt system. It is with respect to these considerations and others that the disclosure herein is presented.

BRIEF SUMMARY

In general, embodiments of the present invention provide methods, apparatus, systems, computing devices, computing entities, and/or the like for predictive prompt generation for an interaction between a party and an automated prompt system. For example, the interaction and the automated prompt system may be a call and an interactive voice response system or a chat and a chatbot.

In various embodiments, metadata is received on the interaction and provided as input to a multi-label predictive model to generate a plurality of interaction probabilities for a plurality of prompt information data objects. For instance, the multi-label predictive model may be a recurrent neural network and the metadata may be one or more sequential input data objects generated based on record answers of the party that were uttered in response to one or more initial questions asked by the automated prompt system.

A prompt information data object is a data object that is configured to be provided to the party by the automated prompt system during the interaction. For example, a prompt information data object may be a question that can be asked the party by the automated prompt system. Each interaction probability generated by the predictive model provides a likelihood a particular data information object needs to be provided to the first party during the interaction. Accordingly, one or more of the prompt information data objects are identified based on the probability of each information data object found in the one or more selected prompt information data objects satisfying an interaction probability threshold (e.g., less than, equal to, and/or above), resulting in one or more notifications being provided so that the automated prompt system provides at least one of the selected prompt information data objects to the first party during the interaction.

In particular embodiments, the plurality of prompt information data objects that is configured to be provided by an automated prompt system during an interaction may be identified by extracting information data objects provided to parties during past interactions using an extraction model. Here, a vector representation of each extracted information data object is generated using an embedding technique and a plurality of classes of similar information data objects is identified from the extracted information data objects using a clustering model configured to cluster information data objects from the extracted information data objects based on the vector representation of each extracted data object. Once the class have been identified, a prompt information data object is identified for each class of similar information data objects to represent the class. For instance, in particular embodiments, the prompt information data object for each class is identified as the information data object found in the similar data objects for the class that has the highest frequency. In addition, the multi-label predictive model may be trained using metadata collected on the plurality of past interactions and the identified prompt information data objects.

Finally, in particular embodiments, the plurality of prompt information data objects may be updated by collecting bypass metadata on a plurality of bypass interactions involving parties that were selected to bypass the predictive prompt generation process. Here, a plurality of new information data objects provided to the parties during the plurality of bypass interactions is extracted using the extraction model and a vector representation is generated for each new information data object. A new class of similar new information data objects may then be identified from the new information data objects using the clustering model and a new prompt information data object may be identified to represent the new class. Accordingly, the multi-label predictive model may then be trained using the bypass metadata and the new prompt information data object. Finally, the plurality of prompt information data objects may be updated based on the new prompt information data object.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

Figure 1:
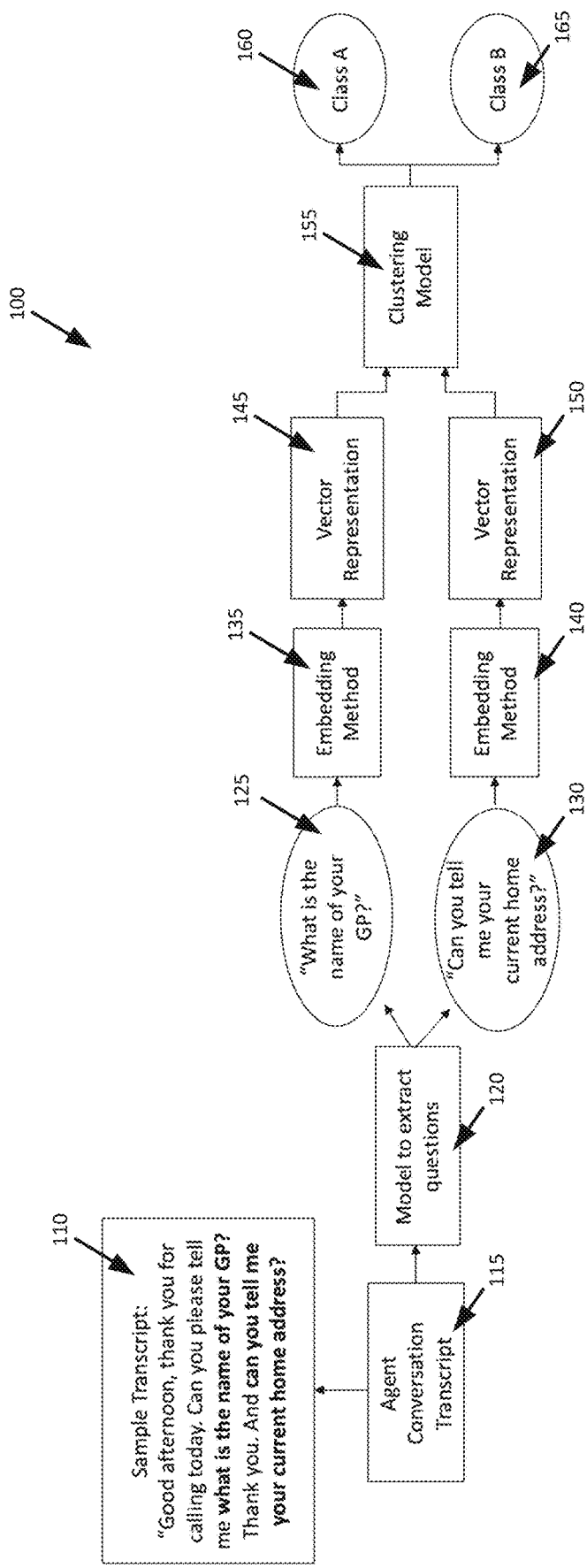
FIG. 1 is an overview process flow for identifying a set of prompt information data objects in accordance with various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "interaction" may refer to a data object that describes a communication session involving two or more parties (e.g., including one or more human participants and/or one or more automated participants). For example, interactions may include audio calls, video calls, Web chat sessions, text message exchanges, email exchanges, and/or the like.

The term "automated prompt system" may refer to a software framework that is configured to conduct an automated interaction with one or more other parties during an interaction. For example, an interactive voice response system (IVR) is a type of automated prompt system that involves technology allowing a computer to interact with humans through the use of voice and dual-tone multi-frequency signaling (DTMF) tones. In some embodiments, an IVR may be used in telecommunications to allow customers to interact with a company's host system via a telephone keypad or by speech recognition. In some of the noted embodiments, the IVR can respond with pre-recorded or dynamically generated audio to further direct the customers on how to proceed. Another example of a type of automated prompt system is a chatbot. A chatbot is a software application used to conduct an on-line chat conversation via text or text-to-speech, in lieu of providing direct contact with a live human. Other examples of automated prompt systems may include an automated attendant and a smart phone application.

The term "information data object" may refer to data describing information that is configured to be provided to a party by an automated response system during an interaction. For example, an information data object may describe a question asked a party during a call or information provided on a screen to a party visiting a website during a Web chat. As discussed further herein, various embodiments of the invention involve identifying "prompt information data objects" that are configured to be provided to parties during interactions based on interaction likelihoods associated with those prompt information data objects.

The term "metadata" may refer to data describing one or more properties of a corresponding interaction and/or at least a portion of the contents of a corresponding interaction. For instance, in particular embodiments, metadata describe contents of an interaction being conducted between a party and an automated prompt system that may be used to identify one or more prompt information data objects that should be provided to the party by the automated prompt system. In some embodiments, the interaction may involve an audio call being conducted between a caller and an IVR. Here, the metadata used in identifying which prompt information data objects to provide the caller by the IVR may include initial information gathered from the caller, information on the caller, the intent of the caller for placing the call, and/or information related to other aspects of the call such as the telephone number called by the caller.

The term "multi-label predictive model" may refer to a data object that describes parameters and/or hyper-parameters of a predictive model that enables assigning probability scores for an input data object with respect to two or more candidate labels. For example, in particular embodiments, a multi-label predictive model is used to identify one or more information data objects from a plurality of prompt information data objects that should be provided to a party, during an interaction. In these instances, the multi-label predictive model provides a prediction for each prompt information data object, where the prediction may describe a likelihood that the prompt information data object needs to be provided to the party during the interaction. In some embodiments, the prompt information data objects may describe questions to ask the party and the multi-label predictive model may provide a prediction for each question as to whether the question needs to be asked from the party during the interaction.

As used herein, the terms "probability" and "interaction probability" may refer to a data object that describes a predicted likelihood that a corresponding prompt information data object is applicable to a particular interaction. In some embodiments, an interaction probability for a particular prompt information data object is generated by processing the prompt information data object using a multi-label predictive model.

The terms "set threshold" and "interaction probability threshold" may refer to a data object that describes a threshold value for an interaction probability that, when satisfied (e.g., exceeded) by the interaction likelihood of a particular prompt information data object, causes selection of the prompt information data objects in order to conduct an interaction corresponding to the interaction probability. For example, in particular embodiments, the set threshold may identify a level of probability required to be provided by a predictive model with respect to an information data object's need during an interaction.

The term notification may refer to a data object that describes a communication used to identify one or more prompt information data objects that should be provided to a party during an interaction. For instance, in particular embodiments, an electronic message may be sent to an automated prompt system during an interaction as a notification to identify an information data object that should be provided to a party during the interaction. In some embodiments, a notification is configured to be provided to a chatbot identifying pricing information on a product advertised on a website should be provided to a visitor to the website who is chatting with the chatbot.

The term "extraction model" may refer to a data object that describes parameters and/or hyper-parameters of a model (e.g., a machine learning model) that is used to extract desired information data objects from an interaction that is associated with a set of candidate information data objects. For example, an extraction model may be used to extract questions asked by a first party from a transcript of an audio call, video call, chat session, and/or the like conducted between the first party and the second party. In this particular example, the extraction model may be configured to classify sentences identified in the transcript as either valid questions or not.

The term "vector representation" may refer to a data object that describes a representation of an information data object as a collection of ordered values. For instance, a set of sentences may be represented as vectors in which each dimension (vector space) corresponds to a representation (e.g., a Word2Vec representation) of a separate word found in the set of sentences. If a word occurs in a particular sentence, then the value corresponding to the word in a vector representation of the sentence may be non-zero (e.g., may be equivalent to a relative frequency of the word).

The terms "embedding technique" and "embedding model" may refer to a data object that describes parameters and/or hyper-parameters of a model that is configured to generate a vector representation of a particular information data object. For instance, in particular embodiments, an embedding technique may be used on a sentence extracted from an interaction to produce a word embedding for each word of the sentence. In general, a word embedding is a type of word representation that allows words with similar meaning to have a similar representation.

The term "information data object class" may refer to a data object that describes a grouping of information data objects formed based on the information data objects having high embedding similarity. For example, a class of similar questions may be formed based on the questions being directed to a similar topic and/or purpose. As discussed further herein, a prompt information data object may be identified for a class of similar information data objects to serve as a representative for the class.

The term "clustering model" may refer to a data object that describes parameters and/or hyper-parameters of a model that is configured to identify information data object classes based on vector representations of a group of information data objects. Examples of clustering models include k-nearest neighbor models, k-means models, density-based spatial clustering of applications with noise (DBSCAN) models, ordering points to identify the clustering structure (OPTICS) models, and/or the like.

The term "prompt information data object" may refer to an information data object that is selected as a representative information data object for an information data object class. In particular embodiments, the prompt information data object is a candidate information data object that may be provided to a party during an interaction when the information for the class is determined as needed to be provided to the party.

Overview of Various Embodiments of the Invention

An overview is now provided to demonstrate various embodiments of the invention. With that said, an example is now described that is used throughout the disclosure to demonstrate various embodiments of the invention. This example is provided to assist the reader in understanding these embodiments and should not be construed to limit the scope of the invention.

The example involves an IVR used within a contact center environment to initially handle inbound calls when they are received so that information can be gathered from the calls to allow the calls to be routed appropriately to agents to handle. Here, the IVR is configured to provide a number of prompts (prompt information data objects) to a caller that asks the caller questions to gather the information. In many instances, these prompts are set out in an IVR flow so that they are provided by the IVR in a ladder-like fashion (e.g., via ladder logic). Therefore, the IVR flow may be configured to provide certain prompts based on the answer to a previous prompt.

In addition, in particular instances, a prompt may not necessarily be a question to gather information from the caller. Instead, in some instances, a prompt may be used to simply deliver information to a caller. For example, a prompt may provide the status of an order to the caller. Here, the IVR may then provide a follow-up prompt asking the caller whether the caller needs any further help. The IVR may then continue with further prompts based on the caller's answer as to whether he or she needs additional help. Therefore, the term "prompt" is used throughout to generally refer to information provided by an automated prompt system to a party during an interaction and is not necessarily provided to provoke a response from the party.

Therefore, although the example of the IVR being used in a contact center to initially field inbound calls is used throughout the disclosure to demonstrate various embodiments of the invention, those of ordinary skill in the art will recognize that the invention is also applicable to other environments that involve using an automated prompt system to field interactions with parties. For instance, various embodiments of the invention may be used in an environment involving chatbots. A chatbot is a software application used to conduct an on-line chat conversation with parties via text or text-to-speech. For example, a party may visit a website that provides a chat option to the party. In many instances, when these chat options are provided, the chats are handled by chatbots instead of humans who exchange chat messages with parties over the chats.

In addition, various embodiments of the invention may be used in other environments that involve using automated prompt systems to exchange other electronic communications such as text messages and/or emails with parties. Further, various embodiments of the invention may be used in environments that involve an application (app) that is downloaded to a device such as a smartphone or television in which the application may be used as an automated prompt system to interact with a party. Those of ordinary skill in the art can envision other environments in which embodiments of the invention may be used in light of this disclosure.

Brief Overview of Technical Problem

Typically, an automated prompt system is configured to provide a predetermined set of prompts (prompt information data objects) to a party who is conducting an interaction with the system so that the system may gather information from the party and/or provide information needed by the party. In many instances, these prompts are organized in a workflow that lays out a sequence in which the prompts are provided to the party. For example, a workflow may be designed to initially prompt the party for a member ID and if the party is unable to provide his or her member ID, then prompt the party for a name and address. However, current approaches are often manually driven and typically are labor intensive to implement these workflows.

In addition, once a party is routed to another party, e.g., human agent, the human agent typically asks the party a number of routine questions and/or provides routine information that can take up a significant portion of the interaction and significantly increase the duration of the interaction. This longer duration of the interaction typically leads to higher operational cost and decreased efficiencies in use of resources such as the system infrastructure used in handling the interaction, as well as the human agent's time.

Brief Overview of Technical Solution

Embodiments of the present invention provide concepts for replacing the existing manually driven processes identifying prompts (prompt information data objects) that may be better suited to be provided by an automated prompt system during an interaction and to integrate such identified prompts into the system. In addition, embodiments of the present invention provide concepts for identifying which of these prompts should be provided during an interaction.

In various embodiments, past interactions are analyzed to identify prompt information data objects that is configured to be provided by an automated prompt system. Here, a prompt information data object may refer to information provided to a party during an interaction such as a prompt asking the party a question. An extraction model is used to extract a targeted group of information data objects from the past interactions. For example, the extraction model may be used to extract a group of questions asked by agents to callers from past inbound calls fielded by the agents. A vector representation of each of the information data objects is then generated and a clustering model is used to cluster the information data objects into groups (classes) of information data objects having high embedding similarity. A representative information data object (prompt information data object) is then identified for each class of similar data information objects to be used as a prompt for the automated prompt system. Accordingly, the prompt information data object selected for each class of similar data information objects is then available for the automated prompt system to use for future interactions.

Thus, various embodiments of the invention allow for information that may be routinely provided by a human during an interaction to be provided by an automated prompt system where the information is oftentimes better suited for an automated setting. Here, embodiments allow for the identification and integration of such information into an automated prompt system that would typically be infeasible to accomplish manually due to the vast complexity of many environments that make use of automated prompt systems and the sheer volume of different reasons for parties to engage in such interactions.

In addition, various embodiments of the invention provide an improved and novel approach for selecting which prompt information data objects should be provided by an automated prompt system during an interaction. In particular embodiments, metadata is collected at the initial outset of an interaction that is then used to identify which prompt information data objects should be provided by the automated prompt system during the interaction. The metadata is generally data used to provide information on the interaction. Here, the metadata may be used as input to one or more predictive models that provide a probability for each prompt information data object as to whether the information data object is likely needed during the interaction. Accordingly, those information data objects with a probability that satisfy a defined threshold are then provided to the party during the interaction. Accordingly, the use of various embodiments to identify which prompt information data objects to provide during an interaction can eliminate the need for redesigning automated prompt system workflows to integrate newly identified prompts.

The disclosed solution is more effective, accurate, and faster than manual implementation. Various embodiments' implementation of identifying and integrating prompt information data objects into automated prompt systems reduces manual effort necessary to designing automated prompt system workflows. In addition, various embodiments' facilitation of having information provided by automated prompt systems instead of humans removes the need for such humans to provide the information themselves, reducing the total handle time required for interactions and thus reducing operational costs and inefficiencies.

Further, the extraction model(s), embedding technique(s), clustering model(s), and predictive model(s) used in various embodiments to identify and integrate prompt information data objects into an automated prompt system, as well as identify which information data objects to provide during an interaction, can carry out complex mathematical operations that cannot be performed by the human mind. Additionally, the solution can reduce the computational load of various systems used in processing interactions while marginally affecting the effective throughput of these systems. Accordingly, various embodiments of the present invention enhance the efficiency and speed of various systems used in processing interactions and make important contributions to the various computational tasks that utilize real-time/expediated processing of interactions.

Brief Overview of Various Embodiments

Turning now to FIG. 1, an overview process flow 100 is shown in accordance with various embodiments of the invention for identifying prompt information data objects that can be integrating into an automated prompt system. The process flow 100 is discussed with respect to the example involving identifying prompt information data objects to use as questions to be integrated into an IVR initially fielding inbound calls for a contact center. Here, a group of previous (historical) interactions, in this case calls, involving callers speaking with human agents is analysed to identify these data information objects.

Accordingly, the audio for the calls may be converted into text transcripts either manually or by using some type of automated speech recognition. For example, a transcript 115 may be produced from the agent's audio channel for each call so that the agent's conversation during the call can be analysed to identify questions asked by the agent during the call. For instance, a sample transcript 110 for a call may include the agent's dialogue broken out into utterances (e.g., spoken sentences) by the agent.

A model 120 may then be used in various embodiments to extract the sentences from each of the transcripts that are questions. Here, a number of different implementations of such a model are available that may be used depending on the embodiment. For instance, Google AI Implementation group has constructed a classifier model that predicts whether a sentence is a question or not. This particular classifier uses lexical and syntactic features that are extracted from a sentence and provides a probability on the likelihood the sentence is a well-formed natural language question. In particular embodiments, the sentences found in a transcript to have a probability identified by the extraction model that satisfy a certain threshold may be identified as a "valid" question asked by the agent during the call.

For example, a sample transcript 110 may include the sentences: "Good afternoon, thank you for calling today;" "Can you please tell me what is the name of your GP?;" "Thank you;" and "And can you tell me your current home address?" The extraction model may provide the probabilities of 0.2, 0.7, 0.1, and 0.8. Here, the threshold may be set 0.7 and therefore, the questions "Can you please tell me what is the name of your GP?" and "And can you tell me your current home address?" are identified as questions asked by the agent during the call. In particular embodiments, non-essential words may also be removed from the questions (or sentences prior to analysis) to help improve further analysis carried out on the questions. Therefore, in the example, the extraction may result in identifying the questions "What is the name of your GP?" 125 and "Can you tell me your current home address?" 130.

Once the questions have been extracted from the various transcripts 115, various embodiments involve creating prompt information data objects from the questions. However, a prompt information data object does not need to be made for every extracted question since many of the questions are asking the same thing. In addition, similar questions may be asked using different variations. For example, the question "What is the name of your GP?" can also be asked as "What is your GP's name?" Therefore, various embodiments of the invention address these issues by merging questions into classes and identifying a prompt information data object for each class.

Accordingly, in particular embodiments, an embedding technique 135, 140 is used on the identified questions 125, 130 to generate vector representations 145, 150 of the questions. Various embedding techniques 135, 140 may be used depending on the embodiment. For instance, in particular embodiments, a count vectorizer may be used that involves generating a vector out of each question based on a word count for each sentence. Here, the unique words that appear in all of the extracted questions are identified to form a word listing. An array is then made for each question that includes a position for each word found in the word listing and the positions in the array corresponding to the words found in the question are set to an integer equal to the occurrence of the word in the question. For example, for the question "What is the name of your GP?" 125, the position in the array for the word "name" would be populated with a one. All the positions in the array for words that do not appear in the question are set to zero.

Other embedding techniques may be used such as a TF-IDF vectorizer that performs a similar process as the count vectorizer except the TF-IDF vectorizer replaces the zeros in the positions of the words that appear in a question with a calculated TF-IDF value. TF is the term frequency determined as the number of times the word appears in the question and IDF is the inverse document frequency determined as the log to the base e of the total number of questions divided by the number of questions in which the word appears. The TF-IDF value is calculated as $1*(\log(N/n))+1$. Those of ordinary skill in the art can envision other embedding techniques that can be used in various embodiments in light of this disclosure.

At this point, a clustering model 155 is used in various embodiments to cluster the questions that are similar into classes of similar questions. Here, the clustering model 155 is configured to cluster questions with high embedding similarity based on the vector representations for the various questions. For instance, in particular embodiments, the clustering model 155 may be configured to carry out a k-nearest neighbor (k-NN) classification to place each question into a class membership 160, 165. A k-NN classification involves classifying a question by a plurality vote of its neighbors, with the question being assigned to the class most common among its k-nearest neighbors. For example, if $k=1$, then a question is assigned to the class of its single nearest neighbor.

Once all of the questions have been placed in a class, a prompt information data object is identified for each class. This prompt information data object represents the class and is what is provided to a party by the automated prompt system in various embodiments during an interaction when a determination is made that the information represented by the class should be provided. Accordingly, different techniques may be used in identifying the prompt information data object for the class depending on the embodiment. For instance, in particular embodiments, the phrasing found most frequently for the similar information data objects that make up the class may be selected as the prompt information data object to represent the class. For example, Class A 160 may include the questions: "What is the name of your GP?;" "Who is your GP?;" "What is the name of your GP?;" and "What's your GP's name?." Here, the phrasing "What is the name of your GP?" may be selected as the prompt information data object for Class A 160 since it is the most frequent phrasing found in the class.

Accordingly, the prompt information data objects can now be used in various embodiments during future calls by the IVR to ask questions of the parties on the calls instead of having agents do so. As a result, various embodiments allow for agents to utilize their time on the calls in a more productive manner than having to ask routine questions that could have been asked prior to the calls being routed to the agents.

It is noted that in particular embodiments, prompt information data objects may only be integrated for use by an automated prompt system if the associated class is for information that has been provided in the past with a certain level of frequency. For example, a class for a question may only contain two occurrences of the question extracted from the sample of historical calls. Therefore, the contact center may not wish to integrate a prompt information data object for this class since the question appears to be infrequently asked by agents. Therefore, a frequency threshold may be utilized in particular embodiments to identify which of the prompt information data objects for the classes should be integrated for use by the automated prompt system.

Following the identification of the prompt information data objects, a predictive model is trained in various embodiments that is used in identifying which of the prompt information data objects should be provided by the automated prompt system during a future interaction. In particular embodiments, a multi-label predictive model is used to provide a prediction with respect to each prompt information data object as to whether that particular data object should be provided by the automated prompt system during an interaction. Here, in the example, the multi-label predictive model is trained using metadata gathered for the historical calls as input and the prompt information data objects, themselves, as outputs. The metadata for a call generally provides information on the call. For example, the metadata for a call may include initial information gathered by the IVR from the caller during the call, general information on the caller, the intent of the caller for placing the call, and/or information related to other aspects of the call such as the telephone number called by the caller.

Accordingly, the model is trained to provide a probability for each of the prompt information data objects indicating a likelihood the information data object needs to be provided during the interaction. As discussed further herein, prompt information data objects with a probability that satisfy a set threshold are identified to be provided to the party by the automated prompt system during the interaction. The set threshold identifies a level of certainty that a particular prompt information data object needs to be provided to the party during the interaction.

Figure 2:
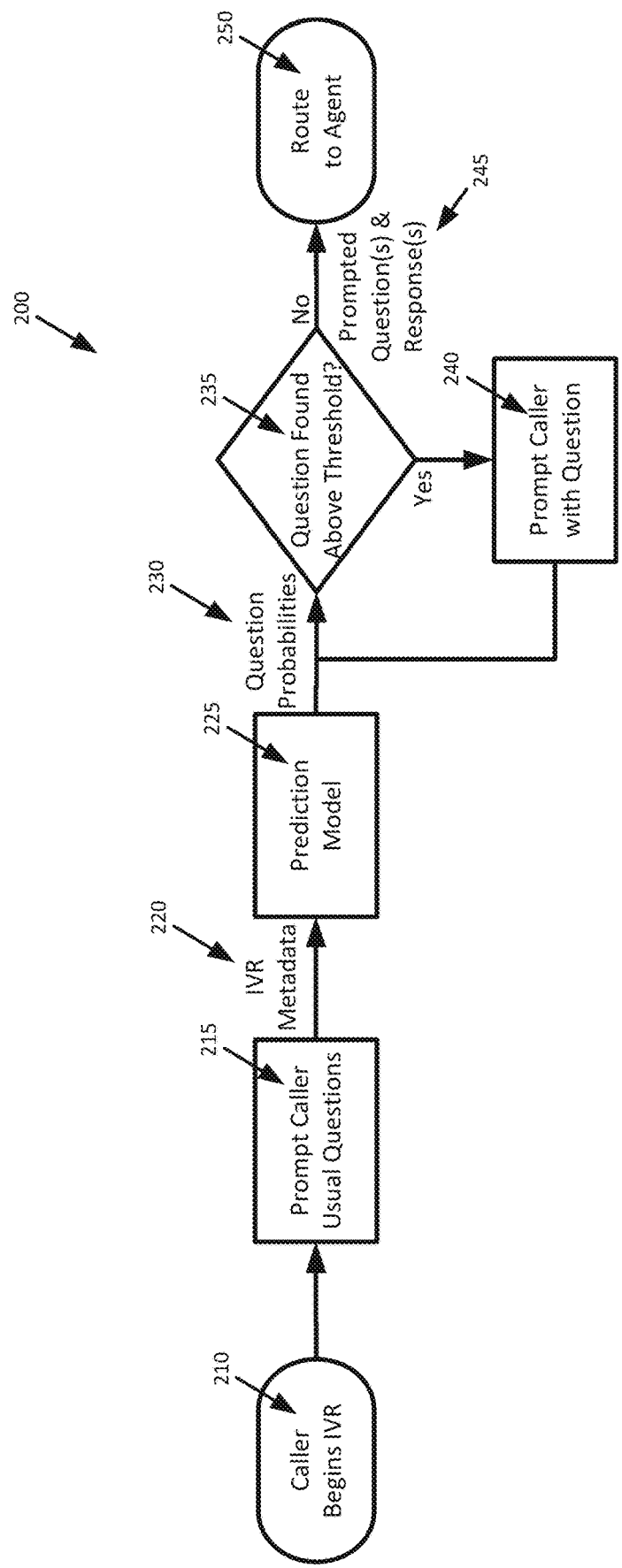
FIG. 2 is an overview process flow for selecting particular prompt information data objects to providing a party during an interaction in accordance with various embodiments of the present invention.

Turning now to FIG. 2, an overview process flow 200 is shown in accordance with various embodiments of the invention for selecting which prompt information data objects should be provided by an automated prompt system to a party during an interaction. Again, the example is used involving the IVR used in a contact center to initially field inbound calls. Therefore, the caller begins the call with interacting with the IVR 210. Here, in particular embodiments, the IVR is configured to gather initial information from the caller. For example, such gathering may involve prompting the caller with one or more usual questions 215 to gather information on the reason for the call and/or to gather information on the identity of the caller. In addition, the IVR may gather other information associated with the call such as the number used by the caller to place the call to the contact center.

The IVR then provides the metadata 220 as input to the predictive model 225. Depending on the embodiment, the predictive model 225 may be hosted by the IVR or by another component within the contact center. Accordingly, the predictive module 225 generates a probability for each prompt question 230 and a determination 235 is made for each question as to whether the probability for the question satisfies the set threshold. If the probability for a particular question satisfies the threshold, then the IVR prompts the caller with the question 240 and records the caller's response.

Once the caller has been prompted with all of the questions with a probability that satisfy the set threshold, the call is routed to an agent to handle 250 along with the information on the prompted question(s) and the caller's response(s) 245. For instance, in particular embodiments, the question(s) and response(s) 245 is configured to be provided to the agent on a pop-up screen on the agent's computer display. As a result, the agent who is handling the call is provided the caller's response(s) to the question(s) that the agent may have otherwise had to ask. Thus, having the questions asked prior to the call being routed to the agent removes the need for the agent to ask these questions. As a result, the agent may make better use of his or her time in handling the call and address the caller's needs in a more effective and efficient manner. In addition, the agent's total handling time for the call may be reduced since the agent is not spending time on questions that could have been asked prior to the call being routed to the agent. All of which can lead to reducing operational costs for the contact center, increased productivity and efficiency on the part of agents and contact center system infrastructure, and higher caller satisfaction.

Computer Program Products, Systems, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid-state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary Contact Center Architecture

Figure 3:
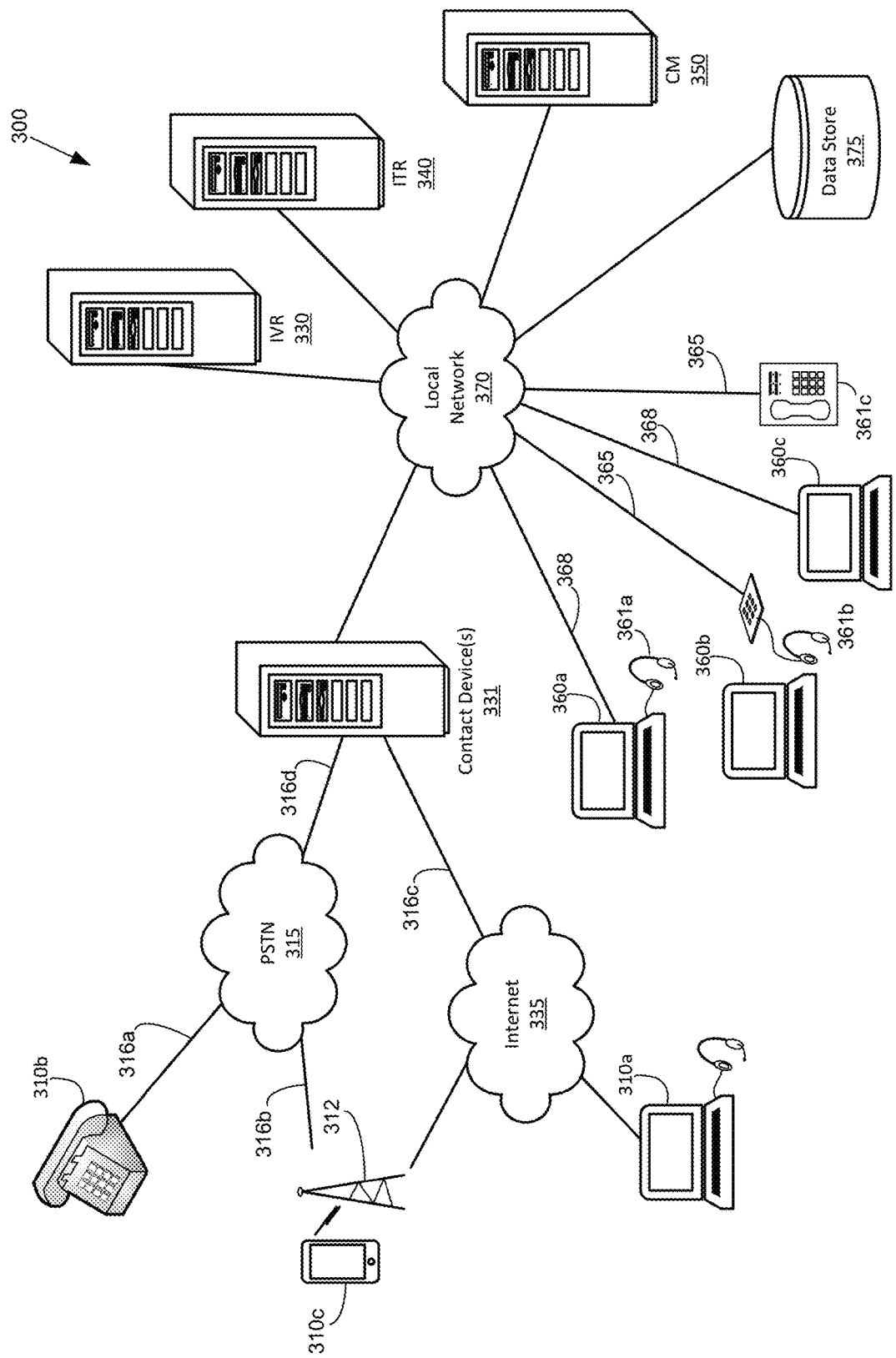
FIG. 3 is a diagram of a system architecture that can be used in conjunction with various embodiments of the present invention.

FIG. 3 provides an illustration of a contact center architecture 300 that may be used in accordance with various embodiments of the invention. A contact center architecture 300 is described herein with respect to the example involving the use of an IVR to initially field inbound calls received by a contact center. However, those of ordinary skill in the art understand that other system architectures making use of automated prompt systems may be used in accordance with various embodiments of the invention.

The contact center architecture 300 shown in FIG. 3 may process various channels of communication such as audio calls, video calls, facsimiles, emails, text messages, Web chat sessions, and/or the like that can be inbound-only, outbound-only, or a combination of both (sometimes referred to as a "blended" contact center). In particular instances, the contact center may be referred to as a call center. However, for purposes of this disclosure, the term "contact center" is used throughout, although it is understood that the two are synonymous. Here, a communication represents an interaction taking place between a party and the contact center (e.g., component within the contact center and/or agent who is employed by the contact center).

With that said, the contact center may handle communications originating from a remote party or initiated to a remote party. Thus, the term "party," without any further qualification, refers to an individual associated with a communication processed by the contact center, where the communication is either received from or placed to the party. In the example, the party may simply be a caller who has placed a called into the contact center.

Depending on the embodiment, communications may originate to or be received from parties that use a variety of different devices. For instance, a party may receive or place a voice call using a conventional analog telephone 310*b* connected to a public switched telephone network ("PSTN") 315 using an analog plain old telephone service ("POTS") line 316*a*. The call may be routed by the PSTN 315 and may comprise various types of facilities 316*d*, including, but not limited to: T1 trunks, SONET based fiber optic networks, ATM networks, and/or the like. Various types of routers, switches, bridges, gateways, and other types of equipment may be involved in the processing of the calls.

In addition, a party may receive or place a communication using a device such as a desktop or laptop computer 310*a*, a smart phone 310*c*, mobile phone, tablet, or other mobile device. Depending on the device, these communications may be placed or received via an Internet provider 335 and/or wirelessly via a mobile service provider ("MSP") 312. For instance, communications may be routed to the PSTN 315 using an integrated services digital network ("ISDN") interface 316*b* or other type of interface that is well known to those skilled in the art. While in other instances, the MSP 312 may route communications as packetized data to/from an Internet provider 335 using Internet-based protocols. For convenience, unless indicated otherwise, the term "trunk" refers to any type of facility 316a, 316b, 316c, 316d providing communication to, or from, the contact center, regardless of the type of protocol or technology used. Specifically, a "trunk" is not limited to time-division multiplexing ("TDM") technology. Those skilled in the art will recognize that a variety of protocols and facilities may be used to convey communications.

Accordingly, the contact center may implement various contact devices 331 for initiating and receiving communications based on the channel of communication. For instance, in various embodiments, communications such as inbound calls and/or inbound text messages are received from parties by a contact device 331 such as an automatic call distributor ("ACD"). In particular embodiments, the ACD may be a specialized switch for receiving and routing inbound calls and/or text messages under various conditions. Further, the ACD may be embodied as a dedicated form of equipment readily available from various manufacturers, or the ACD may be a so-called "soft switch" comprising a suitable programming module executed by a processing device to perform the necessary functions. The ACD may route an incoming call and/or text message over contact center facilities 365, 368 to an available agent. Depending on the embodiment, the facilities 365, 368 may be any suitable technology for conveying the call and/or message, including but not limited to a local area network ("LAN"), wide area network ("WAN"), ISDN, and/or conventional TDM circuits. The exact details typically depend in part on the technology used. For example, in one embodiment, first facilities 365 may be analog or proprietary voice communication technology whereas second facilities 368 may be SIP oriented. As may be appreciated, there are various technologies and configurations that are possible. In addition, the facilities 365, 368 may be the same or different from the facilities used to transport the call and/or message to the ACD.

Depending on the embodiment, the ACD may place a call and/or text message in a queue if there is no suitable agent available. As already noted, the ACD in various embodiments routes a call initially to an interactive voice response component ("IVR") 330 and/or routes a text message initially to an interactive text response component ("ITR") 340. As discussed further herein, the IVR 330 and/or ITR 340 provides prompts (prompt information data objects) to the party on the call or involved in the text message exchange. In particular instances, these prompts may solicit information from the party and the IVR 330 and/or ITR 340 may collect and analyze responses from the party in the form of dual-tone multiple frequency ("DMTF") tones, speech, and/or text. In addition, the IVR 330 and/or ITR 340 may be used to identify metadata, such as, for example, prompting the party to provide account information or otherwise obtain information used to service the call or text message exchange. Further, in particular embodiments, the IVR 330 and/or ITR 340 may identify which prompts (prompt information data objects) should be provided during a call and/or text exchange. Furthermore, in particular embodiments, the IVR 330 and/or ITR 340 may interact with other components, such as a data store 375, to retrieve or provide information for processing the call or text message exchange.

Continuing on, in various embodiments, communications such as outbound calls and/or outbound text messages may be sent using another contact device 331 such as a dialer (e.g., predictive dialer). Again, the dialer may be embodied as a dedicated form of equipment readily available from various manufacturers, or the dialer may be a so-called "soft switch" comprising a suitable programming module executed by a processing device to perform the necessary functions. Accordingly, a predictive dialer is a type of dialer that may originate calls and/or text messages to multiple telephone numbers simultaneously with the expectation that agents will be available to handle one or more of the calls that are answered and/or text messages that are responded to. In various embodiments, the predictive dialer makes use of one or more algorithms to determine how and when to dial/text numbers so as to minimize the likelihood of a party being placed in a queue while maintaining target agent utilization.

Once a call is answered or a text message is responded to by a party, the dialer may connect the call or direct the text message initially to the IVR 330 or ITR 340 and then to an available agent using one or more facilities 365, 368. Other types of dialing methods may be used such as preview dialing in which information about an account is displayed to an agent to review prior to the dialer originating a call or text message to the account. In this way, when the party answers the call or responds to the text message, the agent can interact with the party in an effective way. Further, in particular embodiments, the dialer may be configured so that it attempts to establish communication with parties using a calling/texting list of telephone numbers that is stored in a data store 375.

Depending on the embodiment, other contact devices 331 may be used for originating and/or receiving other channels of communication such as Web chats, emails, text messages, and/or the like. For example, the contact center may make use of a web server to host Web pages and interact with parties via Web chats. In addition, the contact center may make use of an email server to receive and send emails from parties. While in other embodiments, the contact center may convey and/or receive text messages to/from a gateway instead of an ACD or dialer, which then conveys the messages to the Internet provider 335 and on to a mobile service provider 312. In these particular embodiments, such a gateway may provide a way for the contact center to send and/or receive text messages that are not in a native text protocol and can be accepted or conveyed by the mobile service provider 312.

Again, information associated with these other channels of communication may be stored in the data store 375. In addition, like calls, a transfer-like operation may be used in various embodiments to connect a communication that has been answered and/or received with an automated prompt system and/or available agent, or if an agent is not available, a queueing operation may be used to place the communication in a queue until an agent is available.

Accordingly, in various embodiments, the contact center may make use of a communication monitoring component ("CM") 350 to monitor communications and to direct the contact devices 331 on routing communications to various components, queues, and/or agents. Depending on the embodiment, the CM 350 may keep track of the availability of various components, as well as which agents who are available to handle communications and what channels of communications these agents are able to handle. Further, the CM 350 in particular embodiments may identify, instead of an automated prompt system, which prompts (prompt information data objects) should be provided by the automated prompt system during a communication.

An agent at the contact center typically uses a computing device 360a-360c, such as a personal computer, and a voice device 361a-361c to handle communications. The combination of computing device 360a-360c and voice device 361a-361c may be referred to as a "workstation." However, in particular embodiments, the computing device 360a-360c may also handle voice (e.g., VoIP) or voice capabilities may not be needed so that reference to an agent's "workstation" may only refer to a computing device 360a-360c without the use of a separate voice device 361a-361c.

Agents typically log onto their workstations prior to handling communications and this allows the contact center to know which agents are available to potentially receive communications. In particular embodiments, the contact center may also maintain information on each agent's skill level that may be used to route a specific communication to an agent or group of agents having the same skill level. In particular instances, if a suitable agent is not available to handle a particular communication, the contact center (e.g., the contact device 331) may queue the communication for the next available suitable agent.

Depending on the embodiment, interaction between a contact device 331, as well as other components within the contact center architecture 300, and agent's workstation may involve using a local area network ("LAN") 370. In addition, in particular embodiments, an agent may interact with components that provide information to the agent's workstation. For example, when a communication is directed to an agent, information above the party on the communication may be presented to the agent's computer device 360a-360b over the LAN 370 using facility 368.

Although a number of the above entities may be referred to as a "component," each may also be referred to in the art as a "computing device," "unit", "server", or "system." A component may incorporate a local data store and/or interface with an external data store. Use of the word "server" does not necessarily require the component to interact in a formal web-based client-server arrangement with other components, although that may be the case. Further, the above components may be located remotely from (or co-located with) other components. Furthermore, one or more of the components may be implemented on a single processing device to perform the functions described herein. In addition, the contact center architecture 300 is configured to be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 3 represents one possible configuration of a contact center architecture 300, and variations are possible with respect to the protocols, facilities, components, technologies, and equipment used.

Exemplary Computing Entity

Figure 4:
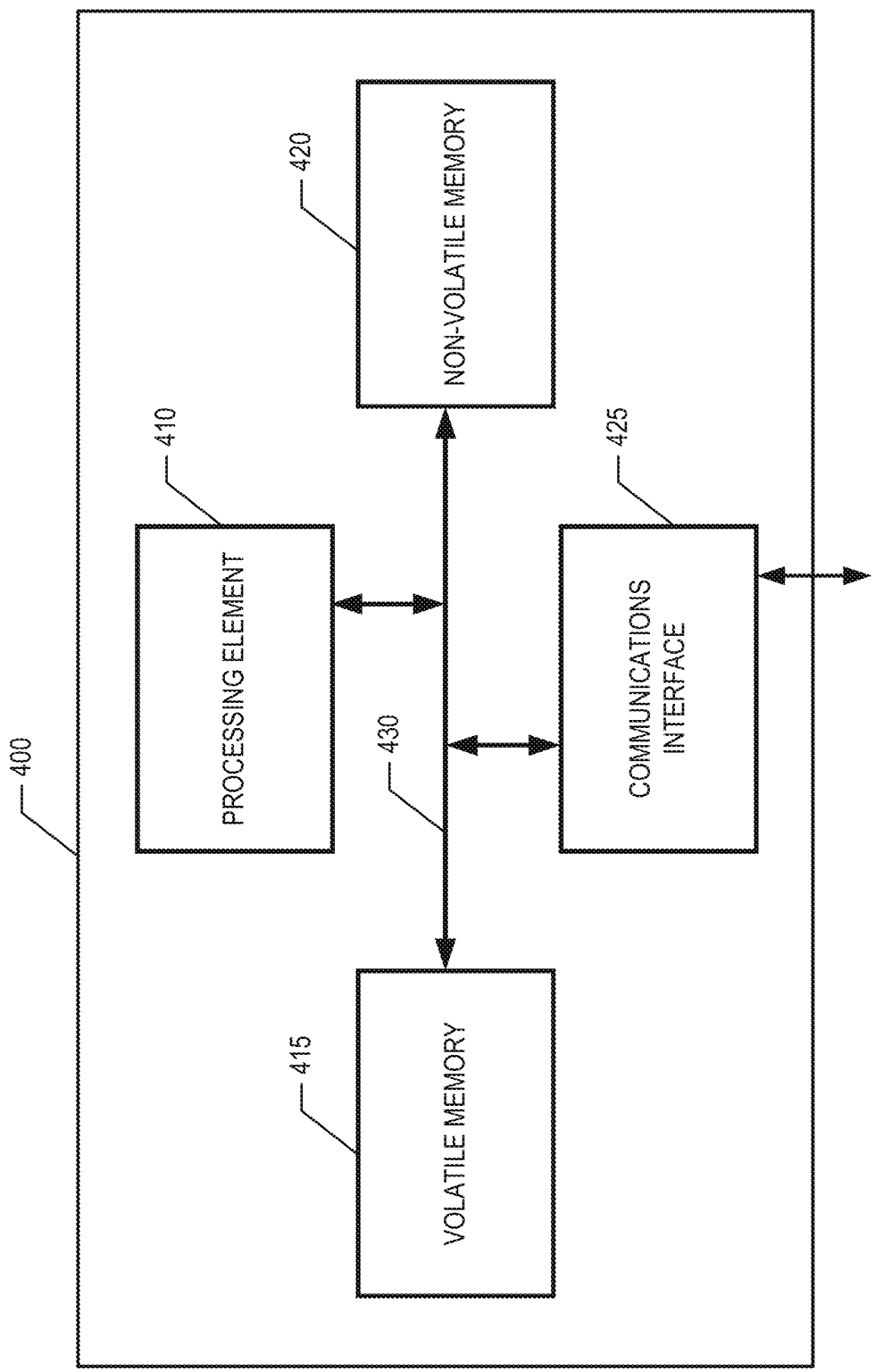
FIG. 4 is a schematic of a computing entity in accordance with various embodiments of the present invention.

FIG. 4 provides a schematic of a computing entity 400 according to various embodiments of the present invention. For instance, the computing entity 400 may be one or more of the components found within the system architecture 300 previously described in FIG. 3. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 400 shown in FIG. 4 may be embodied as a plurality of computing entities, tools, and/or the like operating collectively to perform one or more processes, methods, and/or steps. As just one non-limiting example, the computing entity 400 may comprise a plurality of individual data tools, each of which may perform specified tasks and/or processes.

Depending on the embodiment, the computing entity 400 may include one or more network and/or communications interfaces 425 for communicating with various computing entities, such as by communicating data, content, information, and/or similar terms used herein interchangeably that can be transmitted, received, operated on, processed, displayed, stored, and/or the like. Thus, in certain embodiments, the computing entity 400 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 400 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 400 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 400 includes or is in communication with one or more processing elements 410 (also referred to as processors, processing circuitry, and/or similar terms used herein interchangeably) that communicate with other elements within the computing entity 400 via a bus 430, for example, or network connection. As will be understood, the processing element 410 may be embodied in several different ways. For example, the processing element 410 may be embodied as one or more complex programmable logic devices (CPLDs), microprocessors, multi-core processors, coprocessing entities, application-specific instruction-set processors (ASIPs), and/or controllers. Further, the processing element 410 may be embodied as one or more other processing devices or circuitry. The term circuitry may refer to an entirely hardware embodiment or a combination of hardware and computer program products. Thus, the processing element 410 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 410 may be configured for a particular use or configured to execute instructions stored in volatile or non-volatile media or otherwise accessible to the processing element 410. As such, whether configured by hardware, computer program products, or a combination thereof, the processing element 410 may be capable of performing steps or operations according to embodiments of the present invention when configured accordingly.

In various embodiments, the computing entity 400 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 420 such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 420 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

In particular embodiments, the memory media 420 may also be embodied as a data storage device or devices, as a separate database server or servers, or as a combination of data storage devices and separate database servers. Further, in some embodiments, the memory media 420 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein data storage 375 in which some or all the information/data required for various embodiments of the invention may be stored.

In various embodiments, the computing entity 400 may further include or be in communication with volatile media (also referred to as volatile storage, memory, memory storage, memory circuitry and/or similar terms used herein interchangeably). For instance, the volatile storage or memory may also include one or more volatile storage or memory media 415 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 415 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 410. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 400 with the assistance of the processing element 410 and operating system.

As will be appreciated, one or more of the computing entity's components may be located remotely from other computing entity components, such as in a distributed system. Furthermore, one or more of the components may be aggregated and additional components performing functions described herein may be included in the computing entity 400. Thus, the computing entity 400 can be adapted to accommodate a variety of needs and circumstances.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Identify Prompts Module

Figure 5:
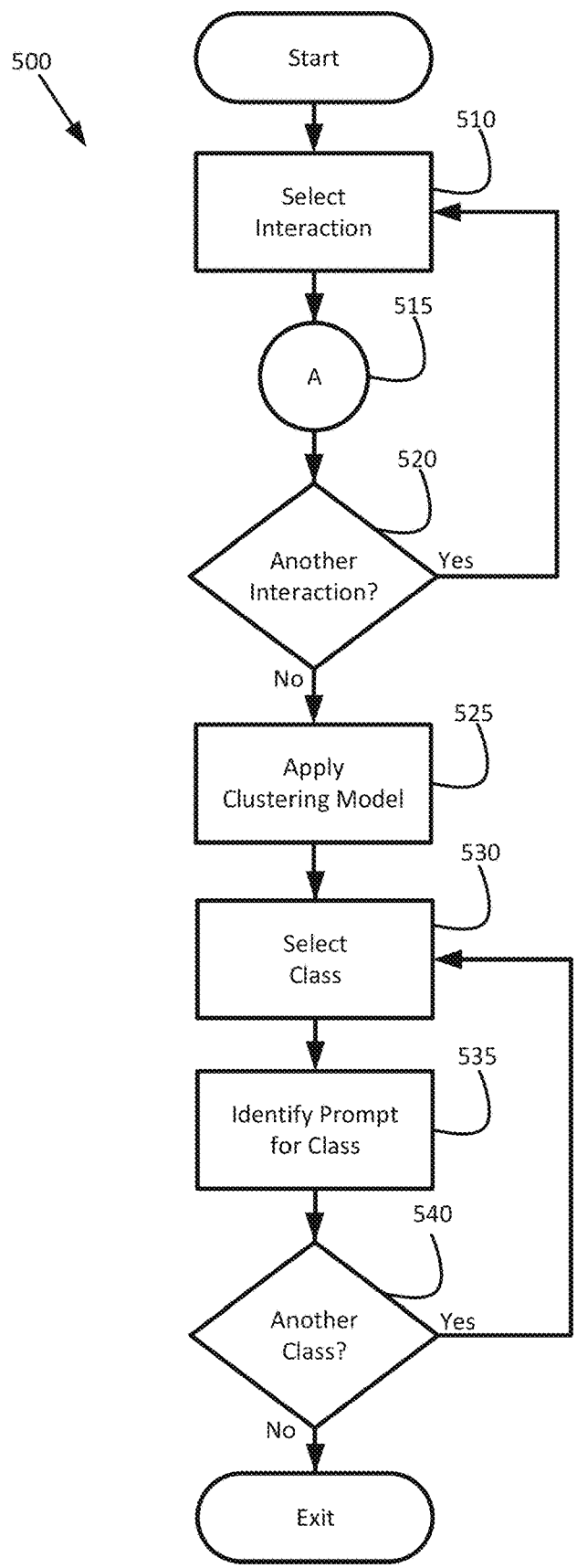
FIG. 5 is a process flow for identifying prompt information data objects in accordance with various embodiments of the present invention.

Turning now to FIG. 5, additional details are provided regarding a process flow for identifying prompt information data objects that may be integrated into an automated prompt system according to various embodiments. FIG. 5 is a flow diagram showing an identify prompts module for performing such functionality according to various embodiments of the invention. For example, the flow diagram shown in FIG. 5 may correspond to operations carried out by a processing element 410 in a computing entity 400, such as the CM 350 described in FIG. 3, as it executes the identify prompts module stored in the computing entity's volatile and/or nonvolatile memory.

The process flow 500 shown in FIG. 5 begins in various embodiments with the identify prompts module selecting an interaction in Operation 510. As previously noted, a group of historical interactions may be selected that are used to identify prompt information data objects that may be integrated into the automated prompt system. For example, the interactions may include chat sessions held between users who had visited a company's website and engaged in chats with agents working for the company to discuss products being sold on the company's website. In another example, the interactions may involve audio calls between callers and agents in a contact center. Here, the callers may have called the contact center to seek technical support on certain purchased products such as laptop computers, appliances, or smart phones. Still in another embodiment, the interactions may involve users of a banking app (e.g., an application installed on the users' mobile devices) exchanging messages with a bank's employees using the app with respect to different accounts the users have with the bank. Those of ordinary skill in the art can envision other types of interactions that may be investigated to identify prompt information data objects that may be integrated into automated prompt systems in light of this disclosure.

Once selected, the identify prompts module extracts data objects from the interaction in Operation 515. The term "information data object" may refer to information provided to a party during an interaction. In general, these information data objects typically have some type of commonality associated with them. For instance, the information data objects comprise questions asked by an agent during the interaction or product information provided to a party during a Web chat. In particular instances, the identify prompts module may extract more than one type of information data object from the interaction. For example, both questions and product information may be extract. Here, the goal may be to identify prompt information data objects for both types of information to incorporate into an automated prompt system.

Accordingly, in various embodiments, the identify prompts module performs the extraction of the information data objects from the interaction by invoking an extraction module and in turn, the extraction module extracts the desired information data objects from the interaction. In addition, the extraction module may be configured to generate a vector representation for each of the extracted information data objects.

At this point, the identify prompts module determines whether another interaction exists in the group of historical interactions in Operation 520. If so, then the identify prompts module returns to Operation 510, selects the next interaction from the group, and extracts the desired information data objects from the newly selected interaction.

Once the identify prompts module has extracted the desired information data objects from each of the interactions, the module applies a clustering model to the extracted information data objects in Operation 525. As previously discussed, the clustering model may be one of any different types of models for recognizing patterns between the extracted information data objects. For instance, in particular embodiments, the clustering model may be based on a k-nearest neighbors clustering that outputs each information data object into a class membership based on the vector representation for the information data object. Here, an information data object is classified by a plurality vote of its neighbors. While in other embodiments, the clustering model may be based on a mean shift clustering that uses a sliding window that attempts to find dense areas of data points. The goal is to locate the center points of each class by updating candidates for center points to be the mean of the points within the sliding window. These candidate windows are then filtered in a post-processing stage to eliminate near-duplicates, forming the final set of center points and their corresponding groups.

Once all of the information data objects have been clustered into classes, the identify prompts module is configured to identify a prompt information data object to represent each class. The prompt information data object is used in various embodiments as a representative for a particular class of similar information data objects and is what is provided to a party by an automated prompt system for the class. Accordingly, the identify prompts module selects a class in Operation 530 and identifies a prompt information data object for the class in Operation 535. As previously noted, in various embodiments, the prompt information data object is the phrasing that is provided by the automated prompt system to a party during a future interaction when the information for the associated class is determined to be needed for the interaction.

Here, the identify prompts module may identify the prompt information data object for the class using a number of different techniques depending on the embodiment. For instance, in particular embodiments, the identify prompts module may be configured to select the phrasing of the information data object found most commonly in the similar information data objects that make up the class. For example, that class may include the questions: "Where is your current home?;" "Where do you live?;" "What is your home address?;" and "What is your home address?." In this example, the identify prompts module would select "What is your home address?" as the prompt information data object to represent the class. Other techniques that may be used in other embodiments such as, for example, using the information data object closest to the centroid for the class as the prompt information data object.

At this point, the identify prompts module determines whether another class exists for which a prompt information data object needs to be identified in Operation 540. If so, the identify prompts module returns to Operation 530, selects the next class, and identifies the prompt information data object for the class. The identify prompts module repeats these operations until a prompt information data object has been identified for each class. As discussed further herein, these prompt information data objects are then used in various embodiments to be provided by an automated prompt system to a party during an interaction based on the likelihood the information data object is needed during the interaction. In many instances, having the automated prompt system deliver the prompt information data object to the party eliminates the need to have a human (e.g., contact center agent) later deliver the same to the party once the interaction has been routed to the human. In addition, information gathered from the party as a result of the automated prompt system providing the prompt information data objects can be forwarded to the human handling the interaction to help the human better manage the interaction.

It is noted that in particular embodiments, the identify prompts module may be configured to identify prompt information data objects only for classes that meet certain criteria. For instance, in particular embodiments, the identify prompts module may be configured to determine that size of a class and only identify prompt information data objects for classes with a size greater than a threshold. For example, the class may need to have a number of pieces of similar information greater than a threshold number to have a prompt information data object identified that is integrated into an automated prompt system. Such a configuration may be used so that only prompt information data objects for classes that are considered of significant importance are integrated into the automate prompt system so as to keep the system more manageable. Those of ordinary skill in the art can envision other criteria that may be used in light of this disclosure.

Extraction Module

Figure 6:
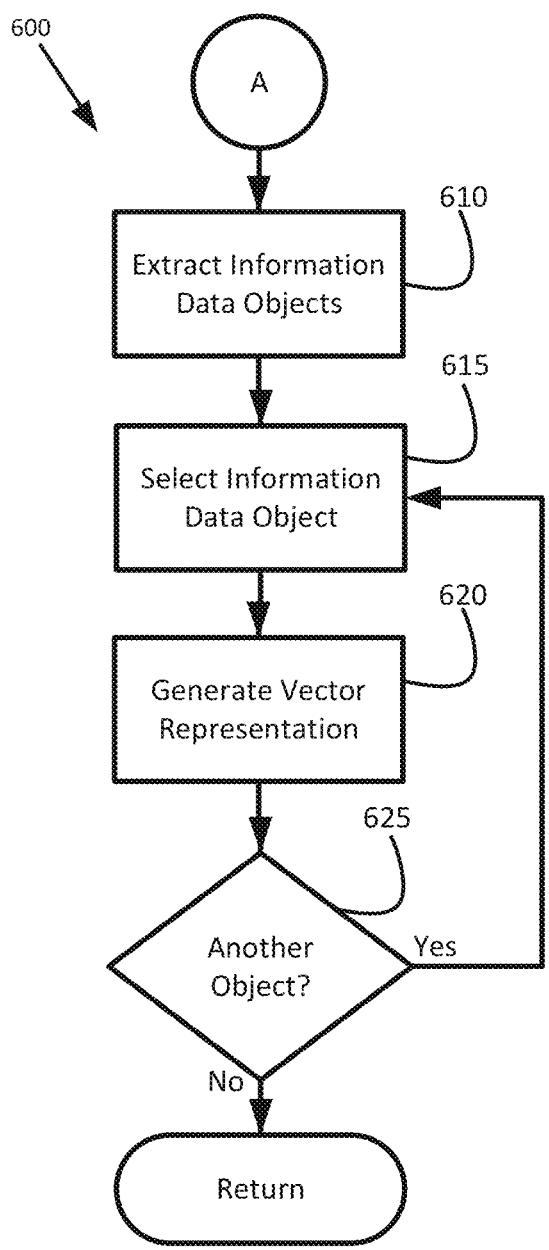
FIG. 6 is a process flow for extracting information data objects from an interaction in accordance with various embodiments of the present invention.

Turning now to FIG. 6, additional details are provided regarding a process flow for extracting information data objects from an interaction and generating a vector representation for each extracted information data object according to various embodiments. FIG. 6 is a flow diagram showing an extraction module for performing such functionality according to various embodiments of the invention. For example, the flow diagram shown in FIG. 6 may correspond to operations carried out by a processing element 410 in a computing entity 400, such as the CM 350 described in FIG. 3, as it executes the extraction module stored in the computing entity's volatile and/or nonvolatile memory.

As previously mentioned, the extraction module may be invoked by another module in various embodiments to extract information data objects from an interaction. For instance, in particular embodiments, the extraction module may be invoked by the identify prompts module as previously described. However, with that said, the extraction module may not necessarily be invoked by another module and may execute as a stand-alone module in other embodiments.

The process flow 600 begins with the extraction module extracting information data objects from an interaction in Operation 610. As previously noted, the extraction module may be configured to use some type extraction model to extract the information data objects from the interaction. Depending on the embodiment, any number of different implementations of such a model are available and may be used. However, in general, the extraction model is configured to identify and extract information data objects that are of interest with respect to the interaction.

For example, if the desired information data objects are questions that were asked by a particular party (e.g., agent) during the interaction, then the extraction model that may be used in particular embodiments is a classifier model such as the one developed by Google AI Implementation group that predicts whether a sentence is a question or not. Here, the extraction module may provide the classifier model with each sentence (e.g., utterance) spoken/typed by the particular party during the interaction, and the model provides a likelihood (e.g., probability) of the sentence being a question. Accordingly, the extraction model may be configured to identify valid questions as those sentences having a likelihood of being a question that satisfy a threshold certainty.

Once the information data objects have been extracted from the interaction, the extraction module selects an information data object in Operation 615 and generates a vector representation of the information data object in Operation 620. As previously discussed, the extraction module may use any one of a number of different embedding techniques depending on the embodiment to generate the vector representation of the information data object such as, for example, a count vectorizer or a TF-IDF vectorizer. As already discussed, the vector representation is then used in various embodiments in assigning the information data object to a class of similar information data objects.

The extraction module determines whether another information data object exists for the interaction in Operation 625. If so, then the extraction module returns to Operation 615, selects the next information data object for the interaction, and generates a vector representation for the newly selected information data object. The extraction module continues to generate vector representations for the information data objects extracted from the interaction until all of the information data objects have been processed.

Select Prompts Module

Figure 7:
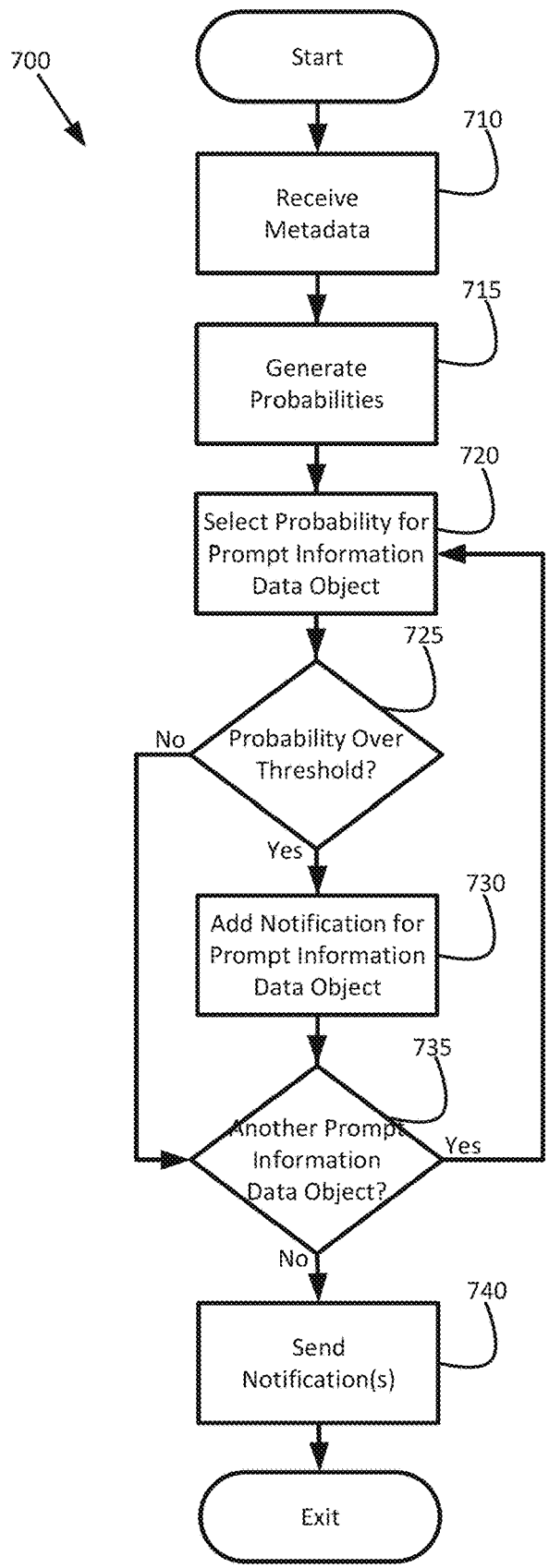
FIG. 7 is a process flow for selecting particular prompt information data objects to provide during an interaction in accordance with various embodiments of the present invention.

Turning now to FIG. 7, additional details are provided regarding a process flow for selecting which prompt information data objects are to be provided by an automated prompt system to a party during an interaction according to various embodiments. FIG. 7 is a flow diagram showing a select prompts module for performing such functionality according to various embodiments of the invention. For example, the flow diagram shown in FIG. 7 may correspond to operations carried out by a processing element 410 in a computing entity 400, such as the IVR 330, ITR 340, or CM 350 described in FIG. 3, as it executes the select prompts module stored in the computing entity's volatile and/or nonvolatile memory.

Here, an automated prompt system may be currently fielding an interaction with a party. For example, the interaction may be audio call, the party may be a caller who has called into a contact center, and the automated prompt system may be an IVR 330. Upon receiving the call, the contact center may have had the call routed to the IVR 330. Accordingly, the IVR 330 may be configured to gather initial information from the caller. For example, the IVR 330 may ask the caller a number of questions that can be used to identify the caller and/or to identify the purpose of the call. In addition, the IVR 330 may gather information related to the call such as the telephone number used by the caller to call into the contact center. Once the IVR 330 has gathered the information, the IVR 330 may then provide the information to the select prompts module as metadata.

Thus, the process flow 700 begins with the select prompts module receiving the metadata for the interaction in Operation 710. The select prompts module then generates a set of probabilities for the various prompt information data objects that is configured to be provided to the party by the automated prompt system (e.g., the IVR) in Operation 715. As previously discussed, the select prompts module generates these probabilities in various embodiments by making use of a multi-label predictive model. Here, the metadata is provided as input to the model and the model generates a probability for each prompt information data object providing a likelihood on whether the information data object is needed for the interaction. For example, if the prompt information data objects are questions, then the model provides a probability for each question on the likelihood the question needs to be asked the party during the interaction.

Accordingly, the multi-label predictive model may be any one of different types of predictive models depending on the embodiment. For instance, in particular embodiments, the multi-label predictive model may be a recursive neural network. A recursive neural network may be used because of its ability to model sequences. Sequences are a data structure where each sample could be seen as a series of information data objects. For instance, the automated prompt system may have asked the party a series of initial questions and the sequence can be seen as a series of answers to the questions in which the answers may depend on each other. A recursive neural network is structured in the same way as a traditional neural network. However, the difference is a unit in a hidden layer of a recursive neural network computes a function of input and its own previous output, known as a cell state. Thus, in the example, an input to a recursive neural network for the interaction may be a sequential representation of the answers to the questions.

A multi-label predictive model allows for each prompt information data object found in a plurality of prompt information data objects to be identified as to whether the information data object should be provided to the party by the automated prompt system. In other words, for any one sample (e.g., for any one interaction), the multi-label predictive model can place the sample into multiple classes (e.g., can identify multiple prompt information data objects that should be provided).

Accordingly, in a multi-label classification setting, the predictive model must produce a final probability for each class that is independent of each other. Therefore, if a neural network is being used as the predictive model, a softmax activation function typically used for the output layer of a neural network for classification purposes cannot be used because this function converts the probability for a class into a score, taking the other probabilities into consideration. Instead, a sigmoid activation function is often used on the output layer of a multi-label classification neural network. The sigmoid activation function converts the probability for each class to a value between zero and one, independent of what the probabilities are for the other classes.

Once the select prompts module has generated the probabilities for the prompt information data objects, the module selects the probability for a particular information data object in Operation 720. The select prompts module then determines whether the probability for the information data object satisfies a set threshold in Operation 725. Here, the set threshold identifies a level of certainty that the particular prompt information data object is needed during the interaction, Therefore, if the probability for the prompt information data object satisfies the set threshold, then the select prompts module adds a notification for the prompt information data object in Operation 730.

Once the select prompts module has evaluated the prompt information data object, the module determines whether another prompt information data object exists in Operation 735. If so, then the select prompts module returns to Operation 720, selects the next prompt information data object, and determines whether to send a notification to the automated prompt system to provide the party with the newly selected prompt information data object.

Once, the select prompts module has evaluated each of the prompt information data objects, the module sends the notifications to the automated prompt system in Operation 740. As a result, the automated prompt system provides the party with the prompt information data objects identified by the notifications during the interaction. For example, if one of the prompt information data objects is a question, then the automated prompt system asks the party the question. Here, the automated prompt system may record the party's answer to the question so that the answer can be provided to a human who the interaction may be routed to further handle.

It is noted that in particular embodiments, the prompt information data objects may be ordered in a manner so that they are provided in a structured sequential order by the automated prompt system to the party during the interaction. This may allow for the information to be delivered to the party in a manner that makes sense to the party.

Further, it is noted that in particular embodiments, the select prompts module may be invoked at different times during an interaction. For instance, the information provided by a party in response to a particular prompt information data object is configured to be provided as metadata to identify further prompt information data objects for the automated prompt system to deliver. For example, an initial prompt information data object selected by the select prompts module may be a question asking the party whether he or she is experiencing a particular problem with a product the party has purchased. Here, the answer to the question may then be used as metadata by the select prompts module in identifying additional questions (additional prompt information data objects) that should be asked about the problem.

Update Module

Figure 8:
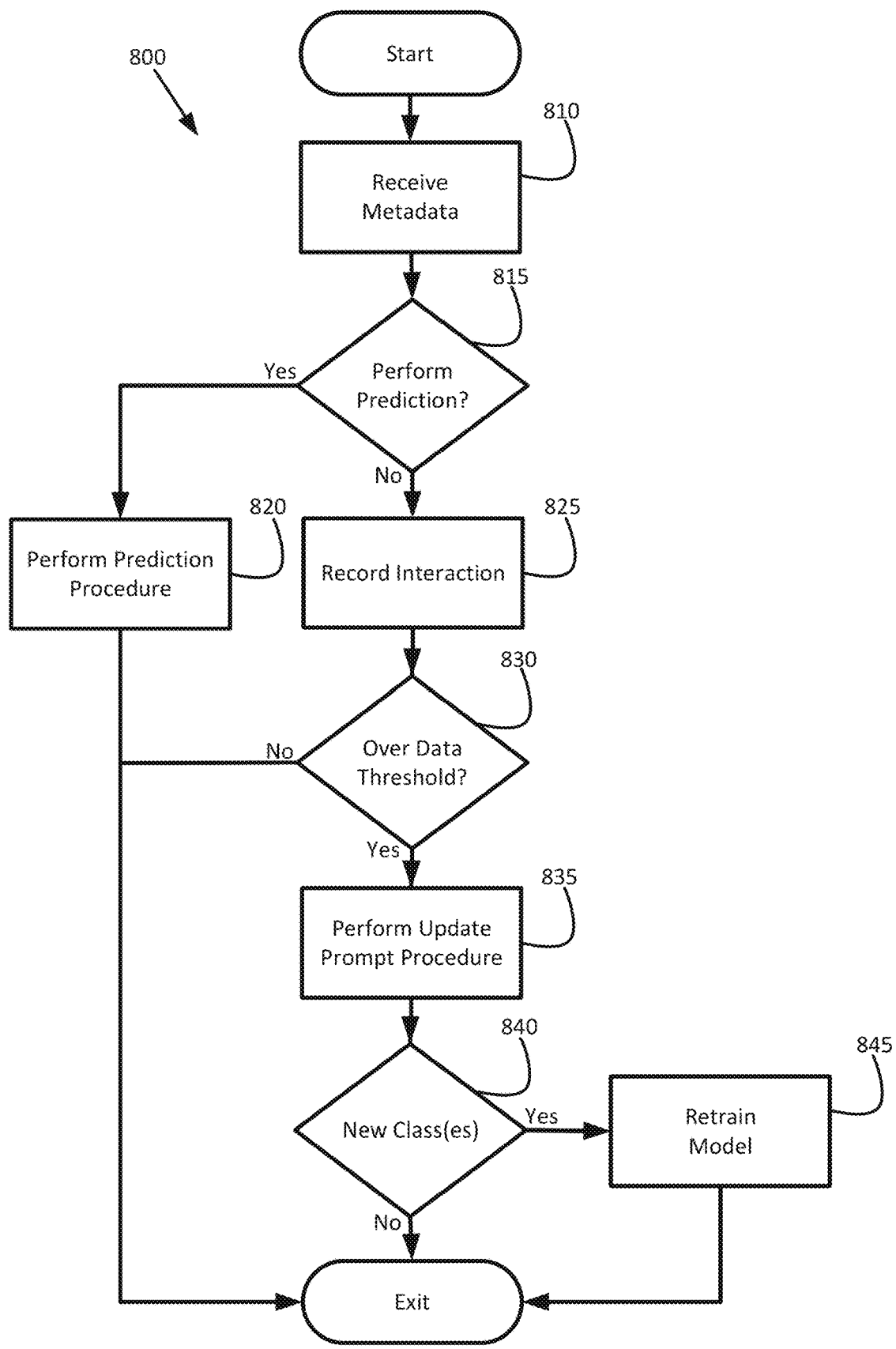
FIG. 8 is a process flow for identifying and integrating new prompt information data objects in accordance with various embodiments of the present invention.

Turning now to FIG. 8, additional details are provided regarding a process flow for identifying and integrating additional prompt information data objects for an automated prompt system according to various embodiments. FIG. 8 is a flow diagram showing an update module for performing such functionality according to various embodiments of the invention. For example, the flow diagram shown in FIG. 8 may correspond to operations carried out by a processing element 410 in a computing entity 400, such as the IVR 330, ITR 340, or CM 350 described in FIG. 3, as it executes the update module stored in the computing entity's volatile and/or nonvolatile memory.

Here, the particular process flow 800 is configured in various embodiments to sort interactions into those in which the predictive procedure should be performed to identify prompt information data objects to have the automated prompt system deliver to the party and those that are recorded and used to identify and integrate new prompt information data objects into the automated prompt system. Therefore, an automated prompt system may be currently fielding an interaction with a party and the automated prompt system gathers information and provides the information to the update module as metadata. In turn, the process flow 800 shown in FIG. 8 begins with the update module receiving the metadata for the interaction in Operation 810.

As noted, the update module determines whether the prediction procedure should be carried out for the interaction in Operation 815. Depending on the embodiment, the update module may be configured to use a variety of criteria in making this decision. For instance, in particular embodiments, the update module may simply be configured to select every certain number of interactions to be filtered out and used for update purposes. While in other embodiments, the update module may make the determination based on some type of information found in the metadata. For example, if the metadata suggests the interaction is directed to a particular topic for which a limited amount of analysis has been carried out to identify prompt information data objects for the topic, then the interaction may be filtered out to use for the update process.

Accordingly, if the update module determines the prediction procedure should be carried out for the interaction, then the module does so in Operation 820. For instance, in particular embodiments, the update module may invoke the select prompts module previously described for the interaction. However, if the update module determines the prediction procedure should not be carried out for the interaction and the interaction should be used for updating purposes, then the module has the interaction bypass the prediction procedure and be recorded in Operation 825. Therefore, in particular embodiments, the update module may have the bypass interaction routed under normal processing without having the prediction procedure carried out on the interaction. For example, the interaction may be routed to an agent to handle. This allows for the party and the agent to converse in manner that may lead to the identification of information data objects provided to the party during the bypass interaction that may be better suited for an automated prompt system. Once the interaction has been concluded, a transcript of the interaction may then be produced and recorded in particular embodiments along with metadata for the interaction.

Accordingly, the update module in various embodiments determines whether a sufficient number of bypass interactions may have been recorded that satisfy a data threshold in Operation 830. For instance, the update module determines whether a number of interactions have been recorded that represent a sufficient sample size to carry out an update analysis. That is to say, a sufficient sample size in some instances to attempt to identify new prompt information data objects that may be integrated into the automated prompt system. Here, one or more data thresholds may be set depending on the embodiment. For example, interactions may be recorded with respect to different topics and a different threshold may be set for each topic.

If the update module determines a sufficient number of bypass interactions have been recorded that warrants conducting an update analysis, then the module has the update prompt procedure performed in Operation 835. Specifically, in particular embodiments, the update module has the identify prompts module previously described perform an analysis on the recorded interactions. Thus, the identify prompts module may identify one or more new classes and associated prompt information data objects for each new class.

Once the analysis has been performed, the update module determines whether any new classes have been identified in Operation 840. If so, then the update module retrains the multi-label predictive model based on the new classes in Operation 845. Accordingly, the multi-label predictive model is retrained using the new prompt information data objects and corresponding metadata and as a result, the prediction procedure is automatically updated to include the new prompt information data objects for the newly identified classes. Thus, the new prompt information data objects are now available as potential prompts to be provided by the automated prompt system to parties during future interactions.

It is noted that the update module may not only be used to update the plurality of prompt information data objects for an automated prompt system by identifying new classes and new corresponding prompt information data objects, the update module may be configured in particular embodiments to update the plurality of prompt information data objects by updating the existing prompt information data objects as well.

Here, the update module may be configured to determine whether a prompt information data object identified during an update is a new prompt information data object or an updated prompt information data object for an existing class. In these particular embodiments, the update module may be configured to have the update prompt procedure performed not just on the new data objects extracted from the bypass interactions but also in addition, performed on the information data objects found in the existing classes. Thus, as a result, one or more new information data objects may be added to an existing class, resulting in an updated prompt information data object for the class. In this instance, the update module may be configured to replace the existing prompt information data object for the class with the updated prompt information data object.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
generating, by one or more processors, based at least in part on metadata associated with an interaction between a party and an automated prompt system and utilizing a trained multi-label predictive model, a plurality of interaction probabilities, wherein:
each interaction probability of the plurality of interaction probabilities is associated with a particular prompt question data object of a plurality of prompt question data objects, and
generating the plurality of prompt question data objects comprises:
generating, by the one or more processors, based at least in part on a plurality of question data objects associated with one or more historical interactions, and utilizing an embedding model, a vector representation for each question data object of the plurality of question data objects;
generating, by the one or more processors, based at least in part on each vector representation for the plurality of question data objects and utilizing a clustering model, a plurality of question data object clusters;
for one or more selected question data object clusters of the plurality of question data object clusters, generating, by the one or more processors, a cluster-representative prompt question data object based at least in part on occurrence counts for a subset of the plurality of question data objects whose vector representations fall within the one or more selected question data object clusters; and
generating, by the one or more processors, the plurality of prompt question data objects to comprise each cluster-representative prompt question data object for the one or more selected question data object clusters;

identifying, by the one or more processors, one or more selected prompt question data objects of the plurality of prompt question data objects, wherein each interaction probability for a selected prompt question data object of the one or more selected prompt question data objects satisfies an interaction probability threshold; and providing, by the one or more processors, at least one of the one or more selected prompt question data objects to the party during the interaction.

2. The computer-implemented method of claim 1, wherein each interaction probability of the plurality of interaction probabilities provides a likelihood that the particular prompt question data object associated with the interaction probability is needed to be provided to the party during the interaction.

3. The computer-implemented method of claim 1, further comprising:
receiving, by the one or more processors, the metadata associated with the interaction.

4. The computer-implemented method of claim 1, wherein the one or more selected question data object clusters comprises each question data object of the plurality of question data objects.

5. The computer-implemented method of claim 1, wherein the one or more selected question data object clusters comprises each question data object of the plurality of question data objects that satisfies a question data object cluster size threshold.

6. The computer-implemented method of claim 1, further comprising:
determining, by the one or more processors, the one or more selected question data object clusters based at least in part on a question data object cluster size for each question data object cluster of the plurality of question data object clusters.

7. The computer-implemented method of claim 1, wherein: (i) the trained multi-label predictive model is configured to generate, for each input interaction, a plurality of output interaction probabilities with respect to a plurality of labels, and (ii) the plurality of labels corresponds to the plurality of prompt question data objects.

8. The computer-implemented method of claim 1, wherein:
the interaction comprises at least one of an audio call session and chat session, and
the automated prompt system comprises at least one of an interactive voice response system and a chatbot system.

9. A system comprising memory and one or more processors communicatively coupled to the memory, the one or more processors configured to:
generate, based at least in part on metadata associated with an interaction between a party and an automated prompt system and utilizing a trained multi-label predictive model, a plurality of interaction probabilities, wherein:
each interaction probability of the plurality of interaction probabilities is associated with a particular prompt question data object of a plurality of prompt question data objects, and
generating the plurality of prompt question data objects comprises:
generating, based at least in part on a plurality of question data objects associated with one or more historical interactions and utilizing an embedding model, a vector representation for each question data object of the plurality of question data objects;
generating, based at least in part on each vector representation for the plurality of question data objects and utilizing a clustering model, a plurality of question data object clusters;
for one or more selected question data object clusters of the plurality of question data object clusters, generating a cluster-representative prompt question data object based at least in part on occurrence counts for a subset of the plurality of question data objects whose vector representations fall within the one or more selected question data object clusters; and
generating the plurality of prompt question data objects to comprise each cluster-representative prompt question data object for the one or more selected question data object clusters;
identify one or more selected prompt question data objects of the plurality of prompt question data objects, wherein each interaction probability for a selected prompt question data object of the one or more selected prompt question data objects satisfies an interaction probability threshold; and
provide at least one of the one or more selected prompt question data objects to the party during the interaction.

10. The system of claim 9, wherein each interaction probability of the plurality of interaction probabilities provides a likelihood that the particular prompt question data object associated with the interaction probability is needed to be provided to the party during the interaction.

11. The system of claim 9, wherein the one or more processors are further configured to:
receive the metadata associated with the interaction.

12. The system of claim 9, wherein the one or more selected question data object clusters comprises each question data object of the plurality of question data objects.

13. The system of claim 9, wherein the one or more selected question data object clusters comprises each question data object of the plurality of question data objects that satisfies a question data object cluster size threshold.

14. The system of claim 9, wherein the one or more processors are further configured to:
determine the one or more selected question data object clusters based at least in part on a question data object cluster size for each question data object cluster of the plurality of question data object clusters.

15. The system of claim 9, wherein: (i) the trained multi-label predictive model is configured to generate, for each input interaction, a plurality of output interaction probabilities with respect to a plurality of labels, and (ii) the plurality of labels correspond to the plurality of prompt question data objects.

16. The system of claim 9, wherein:
the interaction comprises at least one of an audio call session and chat session, and
the automated prompt system comprises at least one of an interactive voice response system and a chatbot system.

17. One or more non-transitory computer-readable storage media including instructions that, when executed by one or more processors, cause the one or more processors to:
generate, based at least in part on metadata associated with an interaction between a party and an automated prompt system and utilizing a trained multi-label predictive model, a plurality of interaction probabilities, wherein:

each interaction probability of the plurality of interaction probabilities is associated with a particular prompt question data object of a plurality of prompt question data objects, and generating the plurality of prompt question data objects comprises:

generating, based at least in part on a plurality of question data objects associated with one or more historical interactions and utilizing an embedding model, a vector representation for each question data object of the plurality of question data objects;

generating, based at least in part on each vector representation for the plurality of question data objects and utilizing a clustering model, a plurality of question data object clusters;

for one or more selected question data object clusters of the plurality of question data object clusters, generating a cluster-representative prompt question data object based at least in part on occurrence counts for a subset of the plurality of question data objects whose vector representations fall within the one or more selected question data object clusters; and generating the plurality of prompt question data objects to comprise each cluster-representative prompt question data object for the one or more selected question data object clusters;

identify one or more selected prompt question data objects of the plurality of prompt question data objects, wherein each interaction probability for a selected prompt question data object of the one or more selected prompt question data objects satisfies an interaction probability threshold; and provide at least one of the one or more selected prompt question data objects to the party during the interaction.

18. The one or more non-transitory computer-readable storage media of claim 17, wherein each interaction probability of the plurality of interaction probabilities provides a likelihood that the particular prompt question data object associated with the interaction probability is needed to be provided to the party during the interaction.

19. The one or more non-transitory computer-readable storage media of claim 17, wherein the instructions further cause the one or more processors to:

receive the metadata associated with the interaction.

20. The one or more non-transitory computer-readable storage media of claim 17, wherein the one or more selected question data object clusters comprises each question data object of the plurality of question data objects.

* * * * *

UNITED STATES PATENT AND TRADEMARK OFFICE
CERTIFICATE OF CORRECTION

PATENT NO. : 11,886,509 B2
APPLICATION NO. : 17/818558
DATED : January 30, 2024
INVENTOR(S) : Gregory Buckley et al.

It is certified that error appears in the above-identified patent and that said Letters Patent is hereby corrected as shown below:

In the Claims

In Column 30, Line 53, Claim 15, delete "labels correspond" and insert -- labels corresponds --, therefor.

Signed and Sealed this
Thirtieth Day of April, 2024

Katherine Kelly Vidal
*Director of the United States Patent and Trademark Office*